United States Patent [19]

Starr et al.

[11] 4,375,104
[45] Feb. 22, 1983

[54] POOL GATEWAY SEAL

[75] Inventors: James A. Starr; Leopold A. Steinert, both of San Jose, Calif.

[73] Assignee: General Electric Company, San Jose, Calif.

[21] Appl. No.: 68,191

[22] Filed: Aug. 20, 1979

[51] Int. Cl.³ .......................... G21C 13/02; G21D 1/02
[52] U.S. Cl. .................................... 376/203; 277/34.3; 49/465; 49/477; 376/272
[58] Field of Search ................ 176/62, 63, 87; 49/57, 49/477, 465; 405/87, 92, 93, 104, 95; 277/34.3; 376/203, 272, 402, 403, 404, 405, 287, 288, 289

[56] References Cited

U.S. PATENT DOCUMENTS

| 1,768,120 | 6/1930 | Crill | 405/104 |
| 2,596,045 | 5/1952 | Rogallo | 49/477 |
| 2,683,354 | 7/1954 | Harza . | |
| 3,142,234 | 7/1964 | Maloon | 49/465 |
| 3,327,439 | 6/1967 | Eatough | 49/465 |
| 3,863,275 | 2/1975 | Brendgord et al. | 49/477 |
| 3,867,254 | 2/1975 | Brandstetter | 376/205 |
| 4,009,953 | 1/1977 | Langeliers et al. | 49/465 |
| 4,129,307 | 12/1978 | Nishiura et al. | 49/477 |
| 4,197,805 | 4/1980 | Puretic | 49/477 |
| 4,214,760 | 7/1980 | Godfrey | 277/34.3 |

FOREIGN PATENT DOCUMENTS

| 754904 | 3/1967 | Canada . | |
| 2941944 | 5/1980 | Fed. Rep. of Germany | 49/477 |
| 1299705 | 6/1962 | France | 376/203 |
| 1334540 | 7/1963 | France | 376/203 |
| 1366818 | 6/1964 | France . | |
| 1423557 | 11/1965 | France . | |
| 2180230 | 11/1973 | France . | |
| 2439865 | 5/1980 | France | 376/203 |
| 1042680 | 9/1966 | United Kingdom | 49/477 |

Primary Examiner—Sal Cangialosi
Attorney, Agent, or Firm—Ivor J. James, Jr.; Samuel E. Turner; Raymond G. Simkins

[57] ABSTRACT

A device for sealing a gateway between interconnectable pools in a nuclear facility comprising a frame supporting a liquid impermeable sheet positioned in a U-shaped gateway between the pools. An inflatable tube carried in a channel in the periphery of the frame and adjoining the gateway provides a seal therebetween when inflated. A restraining arrangement on the bottom edge of the frame is releasably engagable with an adjacent portion of the gateway to restrict the movement of the frame in the U-shaped gateway upon inflation of the tube, thereby enhancing the seal. The impermeable sheet is formed of an elastomer and thus is conformable to a liquid permeable supportive wall upon application of liquid pressure to the side of the sheet opposite the wall.

3 Claims, 3 Drawing Figures

POOL GATEWAY SEAL

BACKGROUND

This invention relates generally to sealing arrangements for pool gateways, and more particularly to removable seals for use between adjoining pools in a nuclear facility.

Nuclear facilities include pools for the storage and service of irradiated components. In such pools the components are submerged in water or other liquids to provide radiation shielding and cooling. These pools are often interconnected through a series of gateways to enable underwater transfer of the irradiated components. The interconnecting gateways also serve to minimize crane clearances required to move components between pools, allowing them to be moved through a gateway rather than over a pool wall.

The liquid level in each of these interconnected pools must be adjusted periodically in accordance with the particular activity taking place. For example, a pool region above a reactor and an adjoining fuel pool typically are both filled with water or other effective liquid during the transfer of fuel; however, the level of liquid in the reactor pool region typically is lowered to provide for subsequent reactor maintenance, while the liquid in the fuel pool usually is kept at the higher level. To accommodate variant liquid levels in adjoining pools a barrier or seal for liquids is required in the interconnecting gateway.

The required seal must be removable to retain the capacity for underwater transfer of irradiated components between pools. The seal also must be capable of remote actuation when submerged. Furthermore, the seal must include minimal permanent pool attachments which might otherwise interfere with operations or adversely affect crane clearances.

In certain nuclear facilities, hinged gates have been used as gateway seals. However, hinged gates are impractical for many applications where the clearance requirements for the sweep of the hinged gates would seriously detract from the useful space of a respective pool. Other nuclear facilities have employed keyed shielding blocks removably stacked in gateways to act as barriers between interconnectable pools. These blocks provide satisfactory radiation shielding from irradiated components contained in the pools. However, the mating surfaces of the keyed blocks usually provide undesirable liquid leakage paths between the adjoining pools.

Removable gates employing inflatable tubes positioned about their peripheries have also been used in the past. However, their effectiveness when used in U-shaped, or open-top gateways, such as those common in nuclear facilities is reduced because the U-shaped design provides no means to restrain the vertical movement of the liquid barrier in reaction to the expansive force of the inflatable sealing tube acting against its lower edge. Thus the expansive force of the tube useful in forming a seal between the lower portion of the gate and an associated portion of the gateway is disadvantageously spent raising the frame.

Accordingly, it is an object of the present invention to provide a new and improved gateway seal between adjoining pools in a nuclear facility.

Another object of the present invention is to provide a sealing device which is removably positionable in a gateway and includes remotely actuatable restraining means to enhance the seal between the sealing device and gateway.

Still another object of the present invention is to provide a sealing device for use in a U-shaped gateway between interconnectable pools in a nuclear facility which includes an inflatable sealing member the expansive forces of which are counteracted on all three sides to provide an enhanced seal between the sealing arrangement and gateway.

SUMMARY

The above and other objects are achieved by a sealing device comprising a frame removably positionable in a gateway between adjacent interconnectable pools. A liquid impermeable pliant sheet sealed to the frame provides a barrier to liquid flow, and an inflatable sealing tube mounted in a channel about the periphery of the frame prevents leakage between the frame and the gateway. Latching devices, which restrain movement of the frame away from the bottom of the gateway and thus enhance the seal provided by the inflatable tube, are carried by the frame and are releasably engagable with the gateway by remote actuation.

In a preferred embodiment, a plurality of spaced latches are provided along the bottom edge of the frame and each latch is controllable from the upper edge of the frame for releasable engagement with the bottom side of the gateway.

DRAWING

DESCRIPTION

Figure 1:
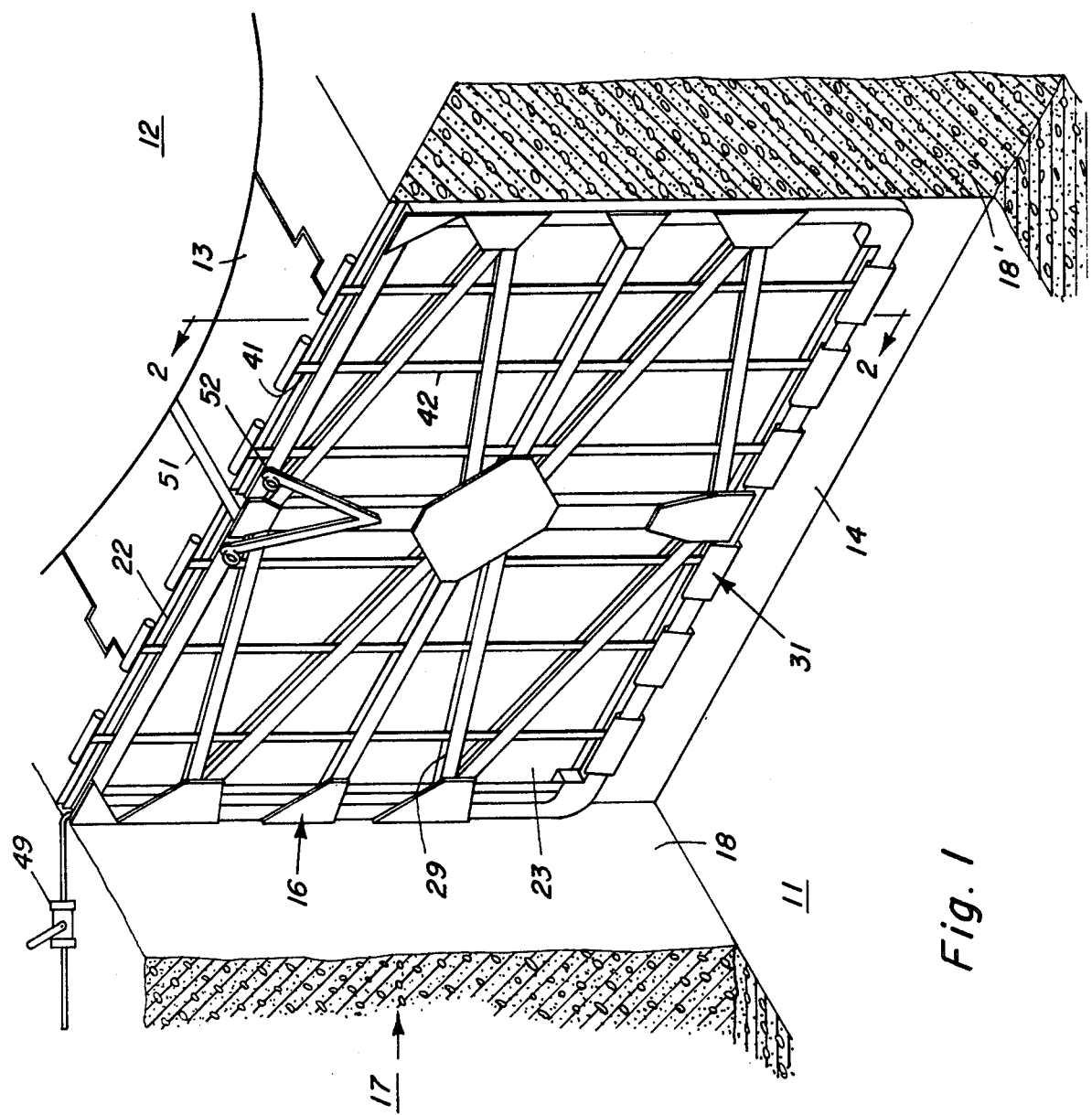
FIG. 1 is a partially sectioned isometric view of a sealing device constructed in accordance with an embodiment of the present invention.
Figure 2:
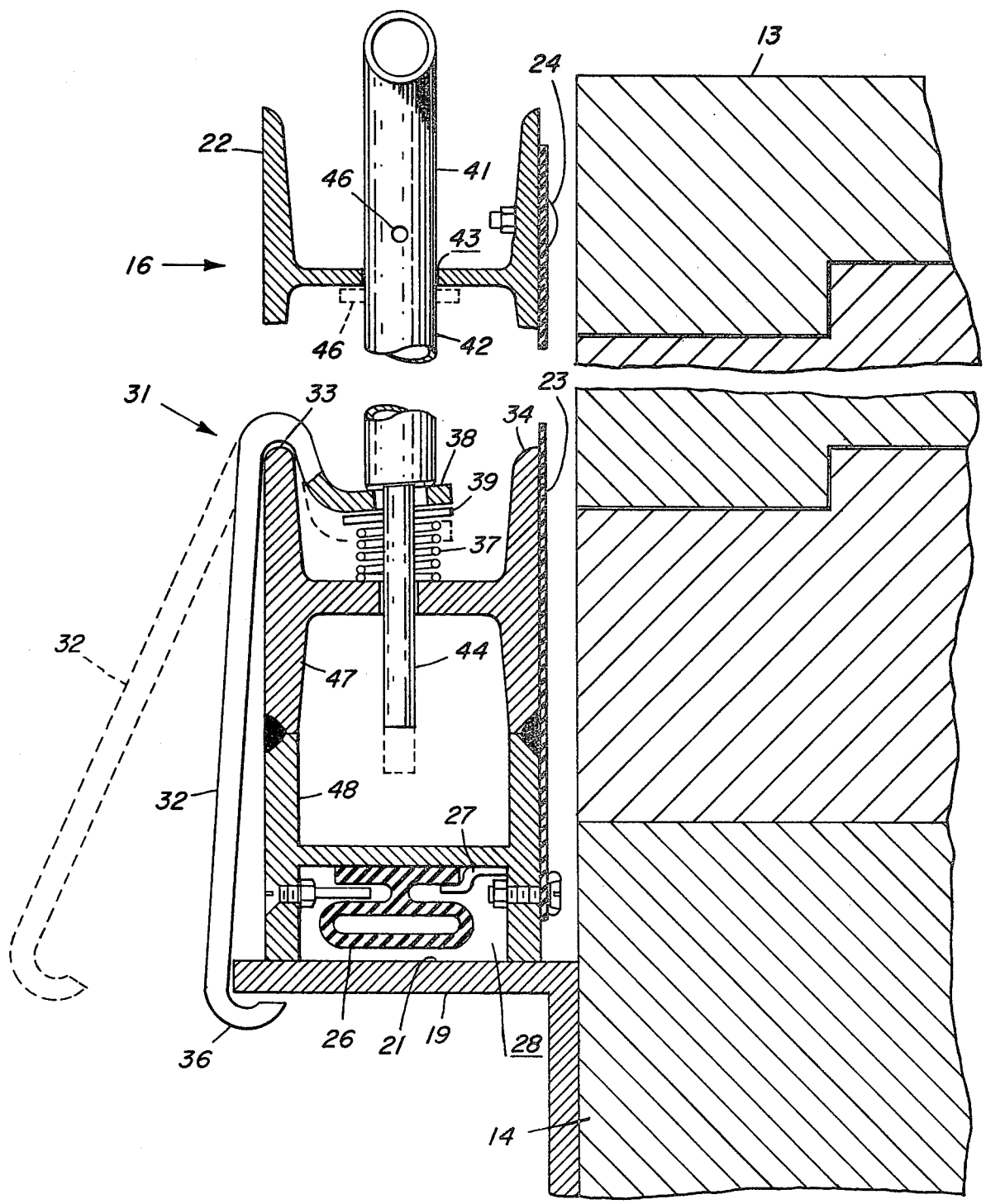
FIG. 2 is a partial sectional view of an inflatable sealing member taken along the line 2—2 of FIG. 1.

As illustrated in FIG. 1, a storage pool 11 in a nuclear facility is separated from an adjoining reactor pool 12 by a plurality of removable keyed shield blocks 13 stacked atop a section of a wall 14 common to both pools. A sealing device 16 is removably positioned in a gateway 17 to prevent the leakage of liquids between the pools 11 and 12 through the shield blocks 13. The gateway 17 is defined by opposed sections of sidewalls 18 and 18' of the storage pool 11 and a support member 19 supported along the common wall 14 as best shown in FIG. 2. The ends of the support member 19 extend upward to blend with the sidewalls 18 and 18' to provide an uninterrupted sealing surface 21 about the U-shaped interior of the gateway 17 for the receipt of the sealing device 16.

Figure 3:
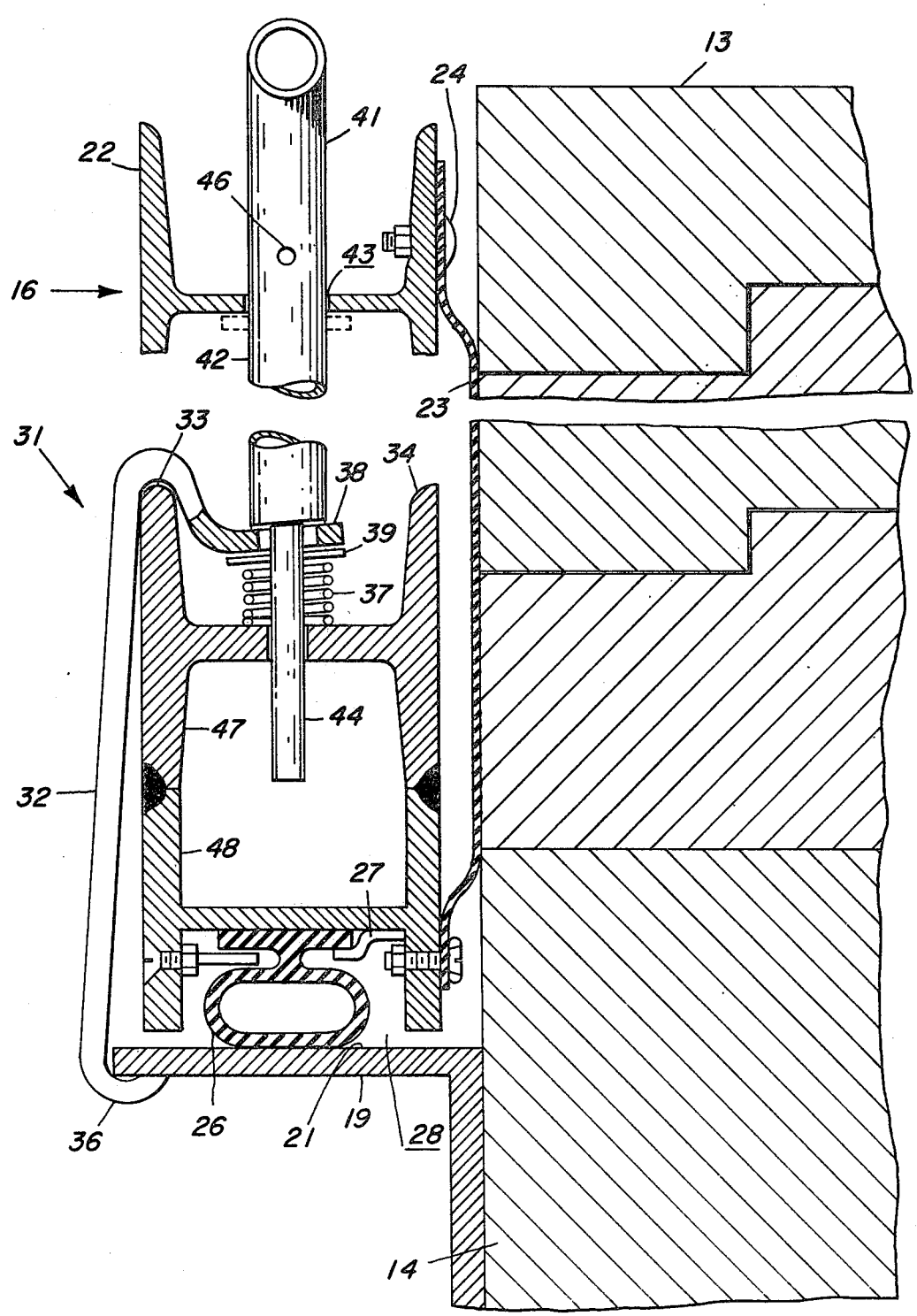
FIG. 3 is a partial view of the sealing member of FIG. 2 in its inflated position showing the pliant sheet in the position assumed thereby under differential water pressure in the pools.

The sealing device 16 includes a frame 22 configured to fit in the gateway 17. As best seen in FIG. 2, a liquid impermeable sheet 23 is sealed by appropriate fasteners 24 to the edges of the frame 22. Although not limited thereto, the liquid impermeable sheet 23 in the preferred embodiment is a radiation-resistant EPDM (ethylene-propylene-diamines monomer) elastomer commercially available from the Presray Corporation, Pawling, NY. The EPDM elastomer sheet has adequate strength and is sufficiently pliant to conform to the irregular surface of the blocks 13 under differential liquid pressure to effect a substantially continuous seal therewith as illustrated in FIG. 3. Additionally, the use of a pliant sheet which conforms to the blocks 13 and the common wall 14 advantageously provides support for the sealing device against differential water pressure, obviating the need for additional structural members for the frame.

To prevent leakage around the sheet 23 and the frame 22 a seal is provided between the frame and the gateway 17 by an inflatable pneumatic sealing tube 26. The tube 26 is mounted on the side and bottom edges of the frame 22 adjacent the sealing surface 21. The tube 26 preferably is formed of EPDM elastomer, and both the tube and appropriate tube fasteners 27 are commercially available from the aforesaid Presray Corporation.

The sealing tube 26 is retained in a U-shaped channel 28 formed about the sides and bottom of the frame 22. As best seen in FIG. 2, the channel 28 is of a predetermined depth greater than the thickness of the uninflated tube 26. Thus, the tube 26 is protected during the positioning of the frame 22 in the gateway 17. This arrangement serves to substantially center the frame in the gateway to facilitate the formation of a uniform seal by the tube 26 when inflated.

The tendency of the sides of the frame 22 to move away from the sealing surface 21 upon pressurization of the tube 26 is restrained by bracing members 29, as shown in FIG. 1, which carry the resulting compressive loading between the opposed sides of the frame 22.

The movement of the bottom of the frame 22 away from the sealing surface 21 on the support member 19, which is unopposed in a conventional U-shaped or open-top gateway, is prevented in the present design by a retraining arrangement in the form of a series of latching devices 31. As illustrated in FIGS. 2 and 3, each latching device 31 includes a hook plate 32 mounted for pivotal movement about a fulcrum provided by a rounded edge 33 machined on an upper portion of a lower horizontal frame member 34. Each hook plate 32 includes a hook portion 36 engagable with the underside of the support member 19, as shown in FIG. 2, whereby upward movement of the sealing device is restrained when the sealing tube 26 is inflated.

Each hook plate 32 is normally biased toward its latching position by a spring 37 cooperating with a lever portion 38 of the hook plate through a washer 39. Thus, the normal expansion of the spring 37 urges the hook plate lever portion 38 upward to thereby pivot the hook portion 36 of the hook plate 32 toward its latching position. To effect the release of the hook plates 32 from their latching positions, each latching device is provided with a remotely actuatable releasing arrangement including a rod 41. The rod 41 includes an elongated upper portion 42 extending through an aperture 43 in the upper member of the frame 22 and a reduced diameter lower portion 44 extending through apertures in the hook plate 32, the spring 37 and the lower horizontal frame member 34. The shaft 41 is depressable against the lever portion 38 of the pivoted hook plate, thus compressing the spring 22 to move the hook plate from its normally biased latching position to a released position as illustrated in phantom view in FIG. 2. When the rod 41 is depressed a pin 46 passes through slots (not shown) in the edge of aperture 43. The shaft is then rotated to take the pin 46 out of alignment with the slots whereby the pin engages the under side of the upper member of frame 22 to retain the shaft 41 in its depressed position and, therefore to retain the hook plate 32 in its released position. When all of the hooks are so released the lower edge of the frame is no longer restrained and the frame can be raised out of the gateway.

The bowing of portions of the frame 22 adjacent the sealing surface 21 of the gateway due to the expansive force of the sealing tube 26 acting thereupon when inflated is prevented by the rigidity of the sides and the bottom of the frame. As seen in FIG. 2 these members are formed of two I-beams 47 and 48 welded together to form a single structural piece. The provision of a series of separate latching devices 31 better accommodates surface distortions, such as the warpage of the adjoining parts, than would a single latching or holding device of suitable length.

After the sealing device 16 is positioned in the gateway 17 to its lowermost position and the latching devices 31 are engaged, the pneumatic sealing tube 26 is inflated by air provided by an air supply 49 indicated in FIG. 1. Upon inflation, the sealing tube 26 expands between the sealing surface 21 of the gateway and the stiffened members of the frame 22 to effect a liquid seal therebetween. Bracing members 29 carry the compressive loading due to the gateway sidewall reaction against the expansive forces of tube pressurization. The expansive force of the tube pressurization acting against the lower portion of the frame is transmitted by the hook plates 32 to the underside of the support member 19. As the difference in the level of liquids contained in the storage pool 11 and the reactor pool 12 increases, the pressure differential caused thereby acts upon the elastomer sheet 23 urging it to conform to the adjacent blocks 13 and common wall 14 to effect a substantially continuous seal thereon. In this manner the blocks 13 and the wall 14 also provide a support for the sealing device 16 by taking up the loading due to the water pressure acting on the sheet 23. Additionally, a buckling brace 51 extending across the top of the blocks 13 may be added to the frame 22, and a plurality of U-bolts 52 may be provided to facilitate the removal of the sealing device by crane.

The above-described embodiment of this invention is intended to be illustrative only and not limiting and it will be appreciated from the foregoing by those skilled in the art that many substitutions, alterations and changes may be made to the disclosed structure without departing from the spirit or the scope of the invention.

What is claimed is:

1. In a nuclear facility including interconnectable pools having a substantially vertically disposed gateway, means for providing a barrier to liquid flow between said pools comprising: a substantially vertically disposed frame removably positionable in said gateway and having a liquid impermeable sheet sealed thereon; an inflatable sealing tube mounted in a channel providing in the sides of said frame corresponding to said gateway, said tube engaging said gateway when inflated to effect a seal between said gateway and said frame; said channel of said frame being deeper than the thickness of said sealing tube when uninflated; a support ledge extending across at least the bottom of said gateway and having a sealing surface extending perpendicular to the plane of said frame when said frame is positioned in said gateway; at least one hook plate mounted for pivotal movement about an edge provided on said frame and cooperating with a spring for normally biasing said hook plate into an engagable position with said support ledge; and means remotely actuatable from the side of said hook plate and cooperating with said hook plate to effect the release thereof from said engagable position with respect to said support ledge.

2. Means for providing a barrier as in claim 1 including a plurality of hook plates each individually biased into engagable position with a portion of said support ledge and individually cooperating with a respective remotely actuatable release means.

3. In a nuclear facility including interconnectable pools having a removable liquid permeable shield wall disposed therebetween and having a substantially vertically disposed gateway adjacent a side of the shield wall, means for providing a barrier to liquid flow between said pools comprising: a substantially vertically disposed frame removably positionable in said gateway and having a liquid impermeable pliant sheet sealed thereon facing and conformable to said shield wall; an inflatable sealing tube mounted in a channel provided in the sides of said frame corresponding to said gateway, said tube engaging said gateway when inflated to effect a seal between said gateway and said frame; said channel of said frame being deeper than the thickness of said sealing tube when uninflated; a support ledge extending across at least the bottom of said gateway and having a sealing surface extending perpendicular to the plane of said frame when said frame is positioned in said gateway; at least one hook plate mounted for pivotal movement about an edge provided on said frame and cooperating with a spring biasing said hook plate into an engagable position with said support ledge; and means remotely actuatable from the side of said frame opposite said hook plate and cooperating with said hook plate to effect the release thereof from said engagable position with respect to said support ledge.

* * * * *